(12) United States Patent
Isson

(10) Patent No.: US 10,976,405 B2
(45) Date of Patent: Apr. 13, 2021

(54) METHOD AND SYSTEM FOR GEOLOCATING A TERMINAL OF A WIRELESS COMMUNICATION SYSTEM

(71) Applicant: SIGFOX, Labege (FR)

(72) Inventor: Olivier Isson, Saint-Orens de Gameville (FR)

(73) Assignee: SIGFOX

( * ) Notice: Subject to any disclaimer, the term of this patent is extended or adjusted under 35 U.S.C. 154(b) by 0 days.

(21) Appl. No.: 16/493,804

(22) PCT Filed: Mar. 15, 2018

(86) PCT No.: PCT/EP2018/056584
§ 371 (c)(1),
(2) Date: Sep. 13, 2019

(87) PCT Pub. No.: WO2018/167231
PCT Pub. Date: Sep. 20, 2018

(65) Prior Publication Data
US 2020/0033438 A1    Jan. 30, 2020

(30) Foreign Application Priority Data

Mar. 15, 2017   (FR) ........................... 1752090

(51) Int. Cl.
*G01S 5/02* (2010.01)
*H04W 64/00* (2009.01)
(Continued)

(52) U.S. Cl.
CPC .......... *G01S 5/0252* (2013.01); *G01S 5/0263* (2013.01); *G06N 3/08* (2013.01); *H04B 17/318* (2015.01);
(Continued)

(58) Field of Classification Search
CPC ....... G01S 5/0252; G01S 5/0263; G06N 3/08; H04W 64/003; H04W 36/30; H04B 17/318
See application file for complete search history.

(56) References Cited

U.S. PATENT DOCUMENTS

| 2011/0090081 A1 | 4/2011 | Khorashadi et al. |
| 2012/0072106 A1* | 3/2012 | Han ..................... G01C 21/206 701/410 |

(Continued)

FOREIGN PATENT DOCUMENTS

| GB | 2498801 | * | 1/2012 | ............. G01C 21/10 |
| GB | 2498801 | | 7/2013 | |

(Continued)

OTHER PUBLICATIONS

International Search Report, International Application No. PCT/EP2018/056584 dated Jun. 13, 2018.

(Continued)

*Primary Examiner* — Muthuswamy G Manoharan
(74) *Attorney, Agent, or Firm* — Perman & Green, LLP

(57) ABSTRACT

A method for geolocating a terminal of a wireless communication system, based on a learning method making it possible to estimate the geographical position of a terminal using both a radio signature corresponding to a set of values representative of the quality of radio links existing between the terminal located at the sought position and a plurality of base stations of the wireless communication system, as well as a reference data set associating radio signatures with known geographical positions. To limit the complexity of the learning algorithm and to make it resistant to topology changes of the access network, each radio signature contains (Continued)

a selection of N values among the set of measured values, as well as the geographical positions of the corresponding base stations.

14 Claims, 3 Drawing Sheets

(51) Int. Cl.
    *H04B 17/318*     (2015.01)
    *G06N 3/08*     (2006.01)
    *H04W 4/021*     (2018.01)
    *H04W 36/30*     (2009.01)

(52) U.S. Cl.
    CPC ............ *H04W 4/021* (2013.01); *H04W 36/30* (2013.01); *H04W 64/003* (2013.01)

(56) References Cited

U.S. PATENT DOCUMENTS

| | | | |
|---|---|---|---|
| 2012/0115510 A1* | 5/2012 | Denby | G01S 5/0252 455/456.1 |
| 2013/0109405 A1 | 5/2013 | Siomina et al. | |
| 2013/0194135 A1 | 8/2013 | Farnham | |
| 2013/0201365 A1 | 8/2013 | Wirola et al. | |
| 2015/0219750 A1* | 8/2015 | Xiao | G01S 5/0215 342/451 |
| 2015/0373501 A1* | 12/2015 | Dribinski | H04W 4/029 455/456.1 |
| 2016/0191775 A1* | 6/2016 | Naguib | G01S 5/0252 348/207.11 |

FOREIGN PATENT DOCUMENTS

| | | | |
|---|---|---|---|
| WO | 2011144966 | 11/2011 | |
| WO | 2013062462 | 5/2013 | |
| WO | WO-2013062462 A1 * | 5/2013 | ............ H04W 64/00 |

OTHER PUBLICATIONS

Khuong An Nguyen, et al. "Reliable indoor location prediction using conformal prediction", Annals of Mathematics and Artificial Intelligence, vol. 74, No. 1-2, dated Oct. 27, 2013, pp. 133-153.

Mohamed Ibrahim, et al. "CellSense: An Accurate Energy-Efficeint GSM Positioning System", IEEE Transactions on Vehicular Technology, IEEE Service Center, Piscataway, NJ, US, vol. 61, No. 1, dated Jan. 1, 2012, pp. 286-296.

* cited by examiner

METHOD AND SYSTEM FOR GEOLOCATING A TERMINAL OF A WIRELESS COMMUNICATION SYSTEM

CROSS REFERENCE TO RELATED APPLICATIONS

This application is a National Stage of International Application No. PCT/EP2018/056584, having an International Filing Date of 15 Mar. 2018, which designated the United States of America, and which International Application was published under PCT Article 21(2) as WO Publication No. 2018/167231 A1, which claims priority from and the benefit of French Patent Application No. 1752090, filed on 15 Mar. 2017, the disclosures of which are incorporated herein by reference in their entireties.

BACKGROUND

1. Field

The presently disclosed embodiment relates to the field of geolocation. In particular, the disclosed embodiment relates to a method for geolocating a terminal of a wireless communication system. The disclosed embodiment particularly applies to the geolocation of an object connected to a network for the Internet of things.

2. Brief Description of Related Developments

In recent years, the increasing use of wireless communication systems has naturally led to the development of services based on the geographical position of a user. Information on the position of an object can be used to ensure user safety (for example to provide assistance to people at risk), navigation aid, traffic management, goods tracking, and general telemetry, etc.

Satellite positioning systems such as GPS (Global Positioning System) constitute some of the most renowned geolocation methods. These systems rely on the exploitation, by a receiver terminal, of radio signals transmitted by dedicated satellites. Geolocation by GPS is particularly accurate, however this system has several major drawbacks. In particular, the integration of a GPS receiver in an object requires electronic hardware and specific software which can lead to a significant increase in the cost of the object in question. On the other hand, the power consumption of such a receiver is often prohibitive in IoT (Internet of Things) type connected objects, the power consumption whereof must be reduced as far as possible. Finally, the penetration of GPS signals inside buildings or through obstacles is poor, making the use of GPS unfit for geolocating objects in closed or densely-packed areas.

Other techniques exist for geolocating a terminal from signals exchanged with the base stations of an access network to which it is connected. In cellular networks, such as GSM (Global System for Mobile Communications) for example, a known method estimates that the position of a terminal is that of the base station with which it is currently associated, it being understood that a terminal is generally associated with the closest base station thereto. However, the accuracy of the geolocation using this method is limited since the coverage area of a base station can have a radius of up to several kilometres, or even several tens of kilometres.

Other methods consist of estimating the distances separating a terminal from a plurality of base stations by calculating the times of arrival (TOA) or the time difference of arrival (TDOA) of signals exchanged between these entities in order to determine the position of the terminal by trilateration. Similar methods are based on the angles of arrival of the signals (known as triangulation), or of course on calculating the frequency difference of arrival (FDOA) of the signals. However, since the latter is based on the Doppler effect, it requires the terminal whose position is being sought to be in motion relative to the observation points. These different methods all suffer from the drawback of requiring specific hardware and software. Secondly, they often require expensive synchronisation of the different base stations acting as observation points. Moreover, they are particularly sensitive to the so-called multipath phenomenon, which corresponds to the propagation of the same radio signal by a plurality of paths as a result of reflection, refraction and diffraction phenomena on the obstacles encountered.

Other geolocation methods are based on the received signal strength indicator (RSSI) level for a signal exchanged between a terminal and a base station. These methods are particularly well adapted to wireless communication systems of the cellular network type (such as GSM for example), for which RSSI information is directly available since it is used by the communication system itself. These methods rely on the fact that a radio signal is attenuated in the atmosphere and that the RSSI level of a signal received by a receiver therefore varies as a function of the distance separating the signal receiver from the signal transmitter. Thus, the geographical position of a terminal can be determined by trilateration by estimating the distance separating the terminal from the different base stations surrounding same based on the RSSI levels measured by the base stations. The drawback of such a geolocation method by trilateration based on RSSI levels is the inaccuracy thereof as a result of the numerous parameters affecting the signal's attenuation (obstacles, radio interference, movement of the terminal, etc.), which make the function defining the distance based on an RSSI level very complex.

This is why new geolocation methods based on RSSI levels have been developed in order to turn the problem of the signal's attenuation into an advantage. These new methods do not implement trilateration methods and thus do not require prior knowledge of the geographical position of the base stations. However, they are based on the assumption that the RSSI level at a given point is stable in time, and rely on machine learning methods which associate a fingerprint with a position in the geographical area considered. In tangible terms, this involves building, in a first calibration stage (also referred to as an "offline" learning stage), a database which associates known geographical positions with a "radio signature" corresponding to the set of RSSI levels measured for a terminal in the position considered for a set of base stations of the system. Then, during a search stage (also referred to as an "online" stage), a radio signature observed for a terminal located in an unknown position is compared with the set of signatures of the database in order to estimate the position of the terminal based on the one or more positions corresponding to the closest one or more signatures thereto.

Several machine learning methods have been used for this purpose. The document entitled *Reliable indoor location prediction using conformal prediction—Khuong An Nguyen, Zhiyuan Luo—Springer Science+Business Media Dordrecht* 2013 describes, for example, the use of a supervised machine learning method from two different perspectives. On the one hand, it presents the problem from a "classification" approach, wherein the learning method will seek to match a radio signature observed with one or more radio signatures in the database that most resemble the signature observed. On the other hand, it presents the problem from a "regression" approach, wherein the learning method will seek to determine, based on the information contained in the database, a function which best defines a geographical position as a function of a radio signature. The document entitled *CellSense: An Accurate Energy-Efficient GSM Position System—Mohamed Ibrahim, Moustafa Youssef—IEEE 2011*, on the other hand describes a classification learning method that is slightly different in that it uses a probabilistic approach: the geographical area considered is divided into cells, and the probabilities of obtaining a certain RSSI level for a given base station are defined for each cell. This therefore involves determining the cell for which the probability of having the radio signature observed is the greatest.

All of these machine learning methods based on RSSI levels have the same drawbacks. Firstly, the calibration stage is particularly fastidious and expensive, especially if the geographical area to be covered is extensive. A known method of carrying out this calibration stage involves embedding appliances in a fleet of vehicles that drive around the area to be covered, said appliances being adapted such that they can accurately provide the geographical position and the RSSI levels for the base stations of the communication system at different points, which method is known as "war-driving". The higher the number of points, the better the performances of the geolocation method in terms of accuracy, however the longer and more expensive the calibration stage. Therefore, the larger the geographical area to be covered, and the higher the number of base stations to be taken into account in the database, the greater the complexity of the machine learning algorithm used. This explains why known geolocation methods based on RSSI levels generally apply to enclosed areas (for example inside buildings) or of course to limited geographical areas (for example urban areas not exceeding several km$^2$). Finally, another major drawback resides in the fact that the radio signature used by known geolocation methods based on RSSI levels is entirely dependent on the network topology at the time of carrying out the calibration stage. More specifically, in such methods, if q represents the number of base stations of the communication system at the time of carrying out the calibration stage, the radio signature is thus a vector $s=(s_1, s_2, \ldots, s_q)$ where $s_i$ represents the RSSI level for the base station i. The set of base stations $i \in [1 \ldots q]$ that allows a radio signature to be determined is thus a fixed set defined beforehand. As a result, if a base station is temporarily unusable (for example when under maintenance), the geolocation method is potentially no longer applicable. Furthermore, if the network topology undergoes lasting changes (rolling out of new base stations, removal or replacement of existing stations), a new calibration stage must be carried out in order for the search stage to be effective.

SUMMARY

The purpose of the presently disclosed embodiment is to overcome all or part of the drawbacks of the prior art, in particular those described hereinabove.

More specifically, and according to a first aspect of, the disclosed embodiment relates to a method for geolocating a terminal, referred to as a "terminal of interest", of a wireless communication system including the following steps of:

determining radio signatures respectively associated with different known geographical positions, each radio signature corresponding to a set of values representative of the quality of radio links that exist between a calibration device, located in one of said known geographical positions, and a plurality of base stations of said wireless communication system, the radio signatures and the associated respective known geographical positions thereof forming a reference data set, determining a radio signature for said terminal of interest located in a geographical position that is to be estimated, estimating the geographical position of said terminal of interest based on the radio signature of said terminal of interest and on the reference data set.

Each determination of a radio signature includes the following steps of:

measuring, for each base station of the plurality of base stations, a value representative of the quality of the radio link that exists between the calibration device or the terminal of interest and the base station considered, selecting N values from the set of measured values, forming the radio signature, including therein the N selected values and the respective geographical positions of the N base stations used to measure said N selected values.

Thus, the complexity of the learning algorithm used to estimate the geographical position sought is reduced since the size of the radio signature is limited. More specifically, the number N of base stations for which the measurements have been selected can be significantly less than the total number of base stations of the system. For example, just 10 measured values could conceivably be used for a system comprising several hundred or even several thousand base stations. The geolocation method is thus adapted to vast geographical areas.

The fact that the radio signal includes the geographical positions of the base stations for which the measurements have been selected compensates for the fact that the radio signature limited in this manner is no longer deterministic, since the collection of base stations used for the definition thereof is no longer fixed: it varies as a function of the geographical position in which the radio signature is observed. Moreover, this makes the learning method able to withstand changes in the topology of the access network. More specifically, if a base station is added, removed or replaced, a radio signature thus determined will remain pertinent, unlike with the known learning methods for which a radio signature is built based on a fixed, ordered set of base stations defined beforehand.

In specific methods of implementing the disclosed embodiment, the disclosed embodiment can further include one or more of the following features, which must be considered singly or according to any combinations technically possible.

In specific methods of implementing the disclosed embodiment, the N selected values correspond to the N values that represent the best radio link qualities measured for the base stations, potentially ordered in descending order.

In preferred methods of implementing the disclosed embodiment, the radio link is an uplink to the base stations of the wireless communication system, and terminals of the wireless communication system equipped with a positioning system acts as calibration devices. These terminals are thus called "calibration terminals". The determination of the radio signature of a calibration terminal located in a geographical position includes the following steps of:

transmitting, by the calibration terminal, a message containing the current geographical position, measured by the positioning system, to the plurality of base stations, measuring, by each base station of the plurality of base stations, a value representative of the quality of the radio link that exists between said calibration terminal and the base station considered based on the message received from said calibration terminal, selecting, by a server connected to the base stations, N values from the set of measured values, forming, by the server, the radio signature of the calibration terminal located in said current geographical position, including therein the N selected values and the geographical positions of the base stations used to measure the N selected values, extracting, by the server, the geographical position contained in said message.

Thus, by supposing that some terminals of the communication system have the capacity to know their geographical position and to transmit same to the access network in certain messages, the calibration stage can take place entirely automatically, i.e. without the need for an expensive war-driving method consisting of embedding appliances in a fleet of vehicles, said appliances being adapted to measure both a geographical position and the associated radio signature in order to acquire reference data. Moreover, the calibration terminals do not necessarily intervene in a specific manner in the geolocation method. More specifically, the messages sent by the calibration terminals can be transmitted independently from the geolocation method, i.e. with a purpose that is different from that of taking part in the geolocation method. Thus, the power consumption and production cost of the terminals are not affected by the geolocation method.

In specific methods of implementing the disclosed embodiment, the calibration terminals are put into effect for a predefined duration in order to form the reference data set, or the reference data set is constantly enriched with new data originating from the calibration terminals.

In preferred methods of implementing the disclosed embodiment, the determination of the radio signature of the terminal of interest located in a geographical position to be estimated includes the following steps of:

transmitting, by the terminal of interest, a message to the plurality of base stations, measuring, by each base station of the plurality of base stations, a value representative of the quality of the radio link that exists between said terminal of interest and the base station considered based on the message received from said terminal of interest, selecting, by a server connected to the base stations, N values from the set of measured values, forming, by the server, the radio signature of the terminal of interest, including therein the N selected values and the geographical positions of the base stations used to measure the N selected values.

In specific methods of implementing the disclosed embodiment, the estimated geographical position of the terminal of interest and the associated radio signature are added to the reference data set.

In preferred methods of implementing the disclosed embodiment, the disclosed embodiment can further include one or more of the following features, which must be considered singly or according to any combinations technically possible:

the value representative of the quality of the radio link that exists between a terminal or a calibration device and a base station is a received signal strength indicator for a radio signal exchanged between said base station and said terminal or said calibration device, the radio link is an ultra-narrowband communication channel, the number N of values selected when determining a radio signature is a positive integer that lies in the range 5 to 20, the estimation of the geographical position of the terminal of interest uses a regression supervised learning algorithm.

According to a second aspect of, the disclosed embodiment relates to a wireless communication system including terminals and an access network including a plurality of base stations connected to a server. The system further includes a database storing a reference data set, each reference datum corresponding to a radio signature associated with a known geographical position, each radio signature comprising N values representative of the quality of radio links that exist between a calibration device located in one of said known geographical positions and N base stations and the geographical positions of said N base stations. Moreover, the access network is configured for:

measuring a value representative of the quality of the radio link that exists between each base station and a terminal, the position whereof is sought to be estimated, referred to as the "terminal of interest", selecting N values from the set of measured values for said terminal of interest, forming a radio signature corresponding to the set of N selected values and geographical positions of the base stations used to measure the N selected values, estimating the geographical position of said terminal of interest as a function of the radio signature of said terminal of interest and of the reference data set stored in the database.

BRIEF DESCRIPTION OF THE FIGURES

The disclosed embodiment will be better understood after reading the following description, intended for purposes of illustration only and not intended to limit the scope of the disclosed embodiment, with reference to FIGS. 1 to 6 which represent.

In these figures, identical reference numerals in one or another figure denote identical or similar elements. For clarity purposes, the elements shown are not to scale, unless specified otherwise.

DETAILED DESCRIPTION

As stated hereinabove, the presently disclosed embodiment aims to geolocate a so-called "terminal of interest" of a wireless communication system using a learning method based on information representative of the quality of radio links that exist between said terminal and base stations of said wireless communication system.

Figure 1:
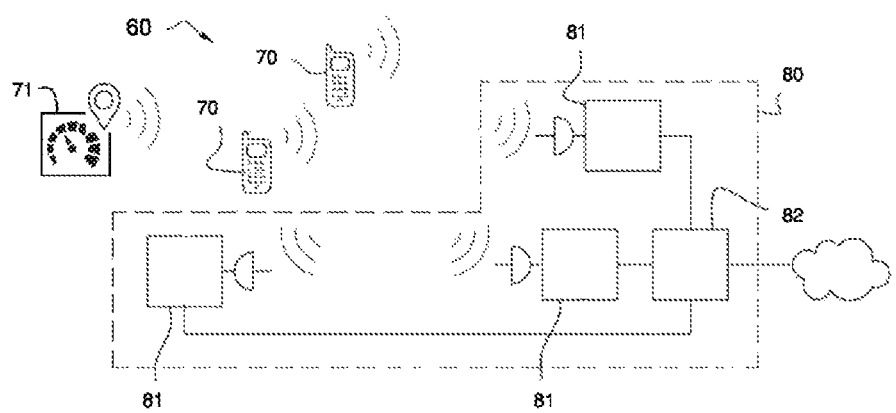
FIG. 1: a diagrammatic view of a wireless communication system including a calibration device.

FIG. 1 diagrammatically illustrates a wireless communication system 60 including a plurality of terminals 70 and an access network 80 including a plurality of base stations 81 connected to a server 82. In such a system, communications can generally be bidirectional, i.e. data can be transmitted from the access network to a terminal over a radio downlink, or from a terminal to the access network over a radio uplink. Moreover, a measurement of the quality of the radio link that exists between a terminal and a base station of the access network can, for example, be carried out by either of these entities.

Moreover, one or more calibration devices 71 adapted to accurately determine the current geographical position, for example with a positioning system such as a GPS receiver, can be inserted into the wireless communication system 60. This calibration device further has means configured to allow a value representative of the quality of the radio link that exists between itself and the base stations of the access network to be measured. As stated hereinabove, this measurement can, for example, be carried out by the calibration device itself, over the downlink, or by a base station of the access network, over the uplink. If the measurement is carried out by the calibration device over the downlink, this measurement can, for example, take place on radio signals to other terminals of the system that are different from the calibration device.

The values representative of the quality of the radio link that exists between a terminal or a calibration device and a base station can be transmitted to the server 82 in order for the latter to implement certain steps of a geolocation method.

Figure 2:
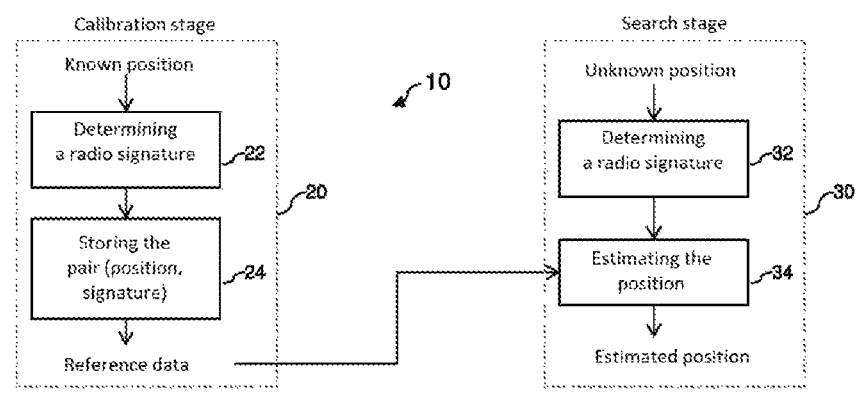
FIG. 2: a diagram showing the main steps of a method for geolocating a terminal of a wireless communication system.

FIG. 2 shows the two main stages of such a method 10 for geolocating a terminal 70 of interest of a wireless communication system 60.

A first calibration stage 20 (also referred to as an "offline" learning stage), includes:
- a step of determining 22 radio signatures respectively associated with known geographical positions, each radio signature corresponding to a set of values representative of the quality of radio links that exist between a calibration device 71, the geographical position whereof is known, and a plurality of base stations 81 of the access network 80 of the wireless communication system 60, and
- a step of storing 24, in a reference data set, each radio signature determined and the geographical position associated with the calibration device 71.

The term "geographical position" is understood herein to mean, for example, a system of at least two coordinates, which are often the latitude and the longitude, to which can optionally be added a third coordinate: the altitude relative to the mean sea level (orthometric height).

To summarise, this involves, during this calibration stage 20, producing a kind of radio mapping of the geographical area considered.

Then, a search stage 30 (also referred to as an "online" learning stage), includes:
- a step of determining 32 a radio signature for said terminal 70 of interest located in a geographical position that is to be estimated,
- a step of estimating 34 the geographical position of said terminal of interest based on the radio signature determined and on the reference data set acquired during the calibration stage 20.

In the remainder of the description, by way of illustration and in a non-limiting manner, the case of an ultra-narrowband wireless communication system 60 is considered. The term "ultra-narrowband" or UNB is understood herein to mean that the instantaneous frequency spectrum of the radio-frequency signals transmitted by the terminals has a frequency bandwidth of less than two kilohertz, or even of less than one kilohertz. The term "radio-frequency signal" must be understood herein to mean an electromagnetic wave propagating via non-wired means, the frequencies whereof lie in the conventional spectrum of radio-frequency waves (several hertz to several hundred gigahertz). Such UNB wireless communication systems are particularly adapted for applications of the M2M (Machine to Machine) type or of the IoT (Internet of Things) type.

In such a wireless communication system 60, the data exchanges are essentially monodirectional, in this instance over an uplink from the terminals 70 to the access network 80 of said wireless communication system. In order to minimise the risks of losing a message transmitted by a terminal, the access network is often planned such that a given geographical area is simultaneously covered by a plurality of base stations 81, such that a message transmitted by a terminal can be received by a plurality of base stations.

Each base station 81 is adapted to receive messages from the terminals 70 that are located within range thereof. Each message thus received is, for example, transmitted to the server 82 of the access network 80, potentially accompanied by other information such as an identifier for the base station that received it, a value representative of the quality of the radio signal carrying the message, and the centre frequency over which the message was received, etc. The server 32 processes, for example, all of the messages received from the different base stations 81. The server 32 can in particular be used to implement the method 10 for geolocating a terminal of the system.

Figure 3:
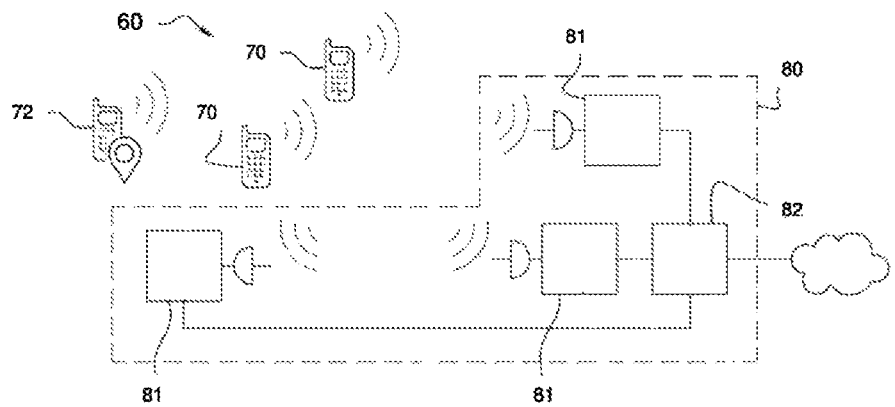
FIG. 3: a diagrammatic view of a preferred aspect of the disclosed embodiment, wherein the calibration device is a terminal equipped with a positioning system.

FIG. 3 diagrammatically illustrates one preferred embodiment of such a system 60 wherein certain terminals 72 of the wireless communication system 60, referred to as "calibration terminals", have a positioning system (for example a GPS receiver) which allows the geographical position of the terminal to be accurately acquired (for example when the terminal is located in a location where it can detect the signals from the satellites of said positioning system). These calibration terminals 72 act as the calibration devices 71 stipulated hereinabove in addition to performing their regular functions in the wireless communication system 60.

Figure 4:
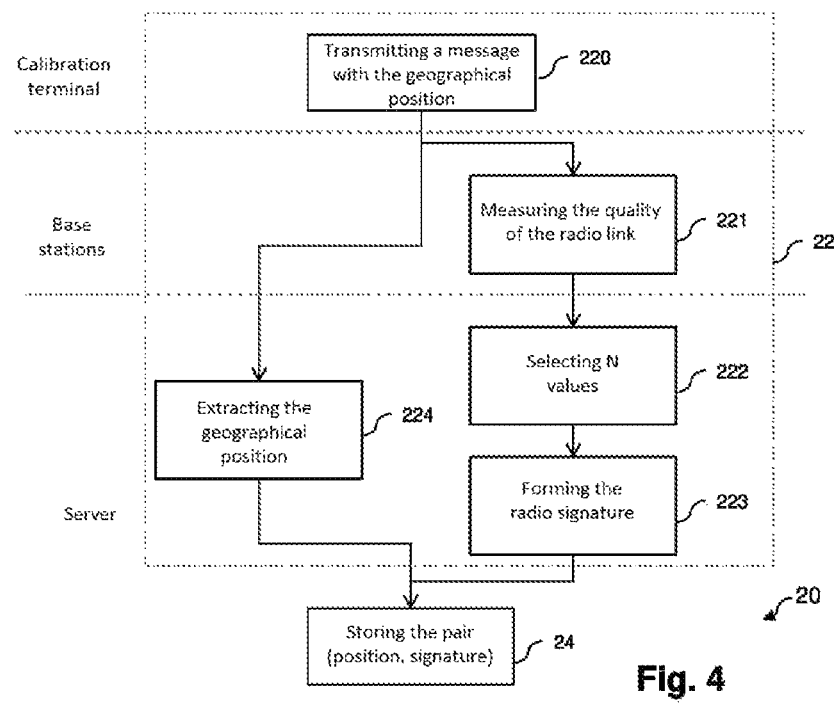
FIG. 4: a diagram showing the main steps of the calibration stage of a preferred method of implementing the geolocation method.

FIG. 4 shows the main steps of the calibration stage 20 of one preferred method of implementing the method 10 for geolocating a terminal 70 of interest of a wireless communication system 60.

For this calibration stage, rather than intentionally driving around the geographical area to be covered with a specific appliance adapted to determine a geographical position and to measure values representative of the quality of the radio link in this position, the potential capacity of certain terminals of the system to fulfil this function is preferably used (since it is less expensive and faster), which is the case of the calibration terminals 72.

Thus, a step of the calibration stage 20 consists of transmitting 220, by a calibration terminal 72, a message containing the current geographical position to the access network 80 of the wireless communication system 60. It should be noted that this message can be transmitted independently from the geolocation method. For example, it can be a conventional telemetry message including the current geographical position and not initially intended to take part in the calibration stage 20 of the geolocation method 10.

The base stations 81 of the access network 80 that have received the signal containing said message thus perform a measurement 221 of the quality of the radio link over which the message was transmitted. In one preferred method of implementing the disclosed embodiment, and for the remainder of the description provided as a non-limiting example, the value representative of the quality of the radio link used is the average received signal strength indicator (RSSI), for example expressed in decibels, received by the base station for the signal carrying said message. For base stations that have not received the message, for example because the terminal is too far away and is not located within the radio coverage thereof, a default value, for example equal to −160 dB is used.

It should be noted that other values representative of the quality of the radio link could be used, for example such as the signal attenuation, a signal to noise ratio (SNR), or a channel quality indicator (CQI).

The RSSI levels measured by the different base stations 81 are transmitted to the server 82, which can thus define the radio signature observed at the geographical position considered.

The known method of the prior art for defining a radio signature involves considering the respective values of the RSSI levels for a fixed, previously-defined collection of base stations of the wireless communication system, the radio coverage whereof has a non-zero intersection with the geographical area considered. In the event that the geolocation method is intended to cover an entire country, or even a group of countries, as might be the case for a wide area network (WAN), several hundred, or even several thousand base stations may need to be considered, and the complexity of the machine learning algorithm could skyrocket.

Conversely, the radio signature defined for the method of implementing the disclosed embodiment currently described reduces this complexity via a step of selecting 222 only N values from the RSSI levels measured.

In one preferred method of implementing the disclosed embodiment, and for the remainder of the description provided as a non-limiting example, the N selected values correspond to the N values that represent the best RSSI levels measured by the base stations of the wireless communication system. However, it should be noted that other selection methods could be considered. For example, the selection could favour the most recent values measured, or could take place according to a relevance criterion, the intention whereof is to use the most discriminating values to build the model. In another example, the N selected values could be ordered in descending order.

However, this limitation to the number of components of the radio signature stops the structure thereof from being deterministic since the collection of base stations used to define a radio signature is no longer fixed: it varies as a function of the geographical position in which the radio signature is observed, and is thus no longer necessarily the same for two radio signatures determined for two different geographical positions. Moreover, a radio signature cannot be directly compared with another since two radio signatures have not necessarily been built from measurements originating from the same base stations. In order to overcome this loss of determinism, additional information must be added. This is why, in a step of forming 223 the radio signature, the geographical positions of the N base stations used to measure the N selected values are included in the radio signature in addition to the N selected values. The geographical position of each base station 81 of the access network 80 of the wireless communication system 60 can, for example, be transmitted to the server 82 during the access network roll-out stage, and every time a new base station is added or moved.

A radio signature is thus advantageously defined by a set of measurements carried out for a set of base stations which has not been defined beforehand, and each measurement is associated with the geographical position of the base station used for the measurement. As a result, even if the access network topology changes, for example if base stations used for the measurements of a radio signature are removed, or if new base stations are added, a radio signature will remain relevant since it will always be representative of RSSI levels measured for base stations "potentially" located in the geographical positions considered.

By considering, by way of a non-limiting example, that the geographical position of a base station is defined by the latitude and longitude thereof, a radio signature observed in a given geographical position can be represented by the vector S of dimension 3.N:

$$S=(RSSI_1,Lat_1,Lng_1,RSSI_2,Lat_2,Lng_2,\ldots,RSSI_N, Lat_N,Lng_N) \quad [1]$$

in which expression, for $i \in [1 \ldots N]$:

$RSSI_i$ is the $i^{th}$ value in the collection of the N highest RSSI levels measured by the base stations, $Lat_i$ is the latitude of the base station having measured $RSSI_i$, and $Lng_i$ is the longitude of the base station having measured $RSSI_i$.

It should be noted that the order of the latitude and longitude parameters in the radio signature is not necessarily important. For example, the signature could also be represented by the vector S1:

$$S1=(RSSI_1,RSSI_2,\ldots,RSSI_N,Lat_1,Lng_1,Lat_2, Lng_2,\ldots,Lat_N,Lng_N) \quad [2]$$

or by the vector S2:

$$S2=(RSSI_1,RSSI_2,\ldots,RSSI_N,Lat_1,Lat_2,\ldots,Lat_N, Lng_1,Lng_2,\ldots,Lng_N) \quad [3]$$

In one preferred method of implementing the disclosed embodiment, if less than N base stations received the message, the latitude and longitude associated with the RSSI values of −160 dB included in the radio signature are set to the arbitrary value of zero. In other methods of implementing the disclosed embodiment, the geographical positions of the base stations located the closest to those that received the message can be used. This choice can have a more or less significant effect depending on the machine learning algorithm used.

The server 82 also extracts 224 information on the geographical position contained in the message transmitted by the calibration terminal 72 (it should be remembered that this message was previously transmitted to the server 82 by the base stations 81 that received it).

Finally, in a final step, the information pair formed by the geographical position of the calibration terminal 72 and the associated radio signature is added to the set of reference data acquired during the calibration stage. For example, this step consists of storing 24 the information pair formed by the geographical position and the associated radio signature in a database stored on the server 82.

In specific methods of implementing the disclosed embodiment, the steps of the calibration stage 20 described hereinabove are repeated for a predefined duration, for example for several days, or even for several weeks or several months, for calibration terminals 72 of the wireless communication system 60, in order to obtain a reference data set containing a large amount of information, i.e. a precise mapping of the area to be covered. In other examples, the steps of the calibration stage 20 could be repeated until a predefined amount of reference data is obtained.

In preferred methods of implementing the disclosed embodiment, the reference data set is constantly enriched with new data originating from the calibration terminals. Thus, if the access network topology changes (for example if base stations are removed or if new base stations are rolled out), the reference data set will be updated with new information which will make the model more closely resemble reality and which will thus increase the accuracy of the estimations made during the search stage.

It should be noted that the calibration terminals 72 can be mobile and can thus supply reference data corresponding to different geographical positions.

It should also be noted that according to other example methods of implementing the disclosed embodiment, the information on the current geographical position of the calibration terminal 72 could be transmitted by another communication system that is different from that for which the RSSI measurements were carried out in order to define the radio signature of said calibration terminal. For example, the current geographical position of the calibration terminal 72 could be transmitted to the server 82 via a mobile telephony network of the GSM, UMTS or LTE type, whereas the message for which the RSSI measurements are carried out is transmitted to the access network 80 of the UNB wireless communication system 60 in our example. In order to ease the association of the radio signature determined for the calibration terminal 72 with the current geographical position thereof, at the server 82, the message carrying the information on the current geographical position and the message transmitted to the UNB wireless communication system can be timestamped for example.

Figure 5:
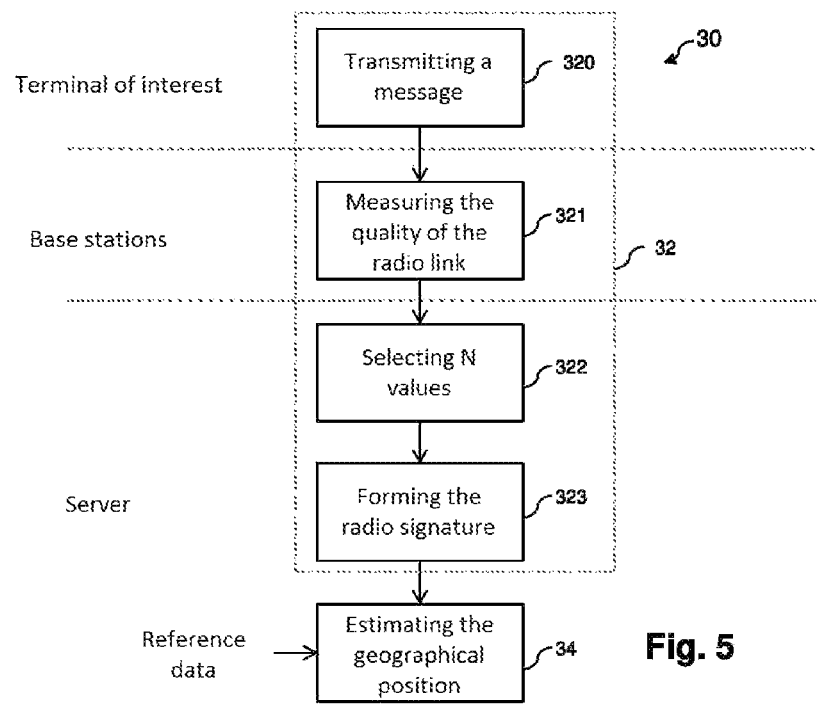
FIG. 5: a diagram showing the main steps of the search stage of a preferred method of implementing the geolocation method.

FIG. 5 shows the main steps of the search stage 30 for one preferred method of implementing the method 10 for geolocating a terminal 70 of interest of a wireless communication system 60.

This search stage 30 is initiated by the transmission 320 of a message by a terminal 70 of interest to the access network 80 of the wireless communication system 60. This message can be any message whatsoever transmitted independently from the method for geolocating the terminal. For example, this message can be transmitted for telemetry purposes that have nothing to do with geolocating the terminal. Alternatively, this message can be transmitted intentionally with the purpose of geolocating the terminal. In any case, the message contents are not necessarily important in the search stage 30.

Similarly to that carried out for the calibration stage 20, the base stations 81 of the access network 80 that received said message measure 321 the RSSI level of the signal carrying the message.

The RSSI levels measured by the different base stations are transmitted to the server 82, which can thus define the radio signature observed in the geographical position sought. The definition of the radio signature for the search stage 30 is, for example, carried out in the same manner as for the calibration stage 20: by a step of selecting 322 N values corresponding to the highest values of the RSSI levels measured, and by a step of forming 323 the radio signature, including therein, in addition to the N selected values, the geographical positions of the N base stations used to measure the N selected values. In the preferred method of implementing the disclosed embodiment currently described, the radio signature observed has the same structure as the vector S of the expression [1].

The estimation 34 of the geographical position of the terminal 70 having transmitted the message is thus carried out based, on the one hand, on the reference data set acquired during the calibration stage 20 and, on the other hand, on the radio signature determined for the terminal of interest, the geographical position whereof must be estimated.

In preferred methods of implementing the disclosed embodiment, a regression machine learning algorithm based on a random forest technique is used to estimate the function that best predicts a geographical position from a radio signature based on the model corresponding to the reference data set. It should be noted that other machine learning techniques could be used (for example a neural network algorithm, a polynomial or linear regression algorithm, or a ridge regression algorithm, etc.), which merely constitute alternative methods of implementing the presently disclosed embodiment.

In other words, if M is the total number of reference data, i.e. the number of pairs $(P_j, S_j)$, $j \in [1 \ldots M]$ acquired during the calibration stage, where $P_j$ is a known geographical position of a calibration device 71 and where $S_j$ is the associated radio signature, whereby:

$$S_j = (RSSI_{j,1}, Lat_{j,1}, Lng_{j,1}, \ldots, RSSI_{j,k}, Lat_{j,k}, Lng_{j,k}, \ldots RSSI_{j,N}, Lat_{j,N}, Lng_{j,N})$$

$$P_j = (Lat_j, Lng_j)$$

then the regression algorithm provides the estimated function f which best satisfies the set of matrix equations defined by:

$$P_j = f(S_j), \forall j \in [1 \ldots M]$$

In these expressions, for $j \in [1 \ldots M]$, $k \in [1 \ldots N]$:
$RSSI_{j,k}$ is the $k^{th}$ value in the collection of the N highest RSSI levels measured by the base stations for a terminal located in the geographical position $P_j$,
$Lat_{j,k}$ is the latitude of the base station having measured $RSSI_{j,k}$,
$Lng_{j,k}$ is the longitude of the base station having measured $RSSI_{j,k}$,
$Lat_j$ is the latitude of the geographical position $P_j$
$Lng_j$ is the longitude of the geographical position $P_j$ Thus, based on an observed radio signature $S_R$ for the terminal of interest located in a sought geographical position $P_R$, $P_R$ can be estimated to be:

$$P_R = f(s_R)$$

In specific methods of implementing the invention, when the geographical position $P_R$ of a terminal is estimated during the search stage 30 based on the associated radio signature $S_R$ thereof, then the pair $(P_R, S_R)$ is added to the reference data set. Thus, the reference data set is constantly enriched with new data, making the model more comprehensive and thus making subsequent predictions more accurate.

Simulations have been carried out for the preferred embodiments and methods of implementing the disclosed embodiment described hereinabove. They highlight performance improvements in terms of reduced complexity and of geolocation accuracy.

With regard to reducing complexity, these simulations more specifically show that the calculation time required for the step of estimating 34 a geographical position of a terminal varies in an almost linear manner as a function of the number N of values selected in steps 222 and 322 of the steps of determining 22 and 32 a radio signature. In other words, if the number of selected values is divided by one hundred, the calculation time is substantially also divided by one hundred.

With regard to geolocation accuracy, the simulations show that this significantly increases with N until N=10, from which point the improvement becomes negligible. The value N=10 is thus the value that procures the best compromise between complexity and accuracy. When N takes on high values (for example exceeding several hundred), geolocation accuracy falls.

Figure 6:
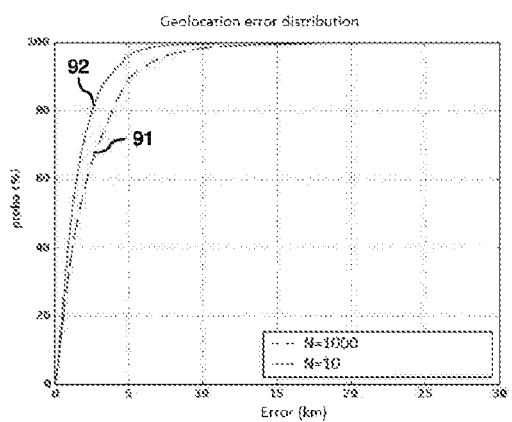
FIG. 6: a chart showing two geolocation error distribution curves for two different N values.

More specifically, FIG. 6 shows two geolocation error distribution curves: one curve 91 corresponding to a value N=1,000, and one curve 92 corresponding to a value N=10. The results show that for N=1,000, the geolocation error is less than 5 kilometres in 90% of cases, whereas for N=10, the geolocation error is less than 3.5 kilometres in 90% of cases.

A geolocation accuracy of about one kilometre is entirely acceptable for a large number of applications linked to the communication system considered, for example such as tracking goods across one or more countries.

The embodiments and methods of implementing the disclosed embodiment described hereinabove overcome the problems stipulated in the description of the prior art and further procure additional advantages.

In particular, by limiting the number N of selected values, the geolocation method described is adapted to cover very large geographical areas, i.e. an entire country, or even several countries, while maintaining entirely satisfactory performance levels in terms of complexity (calculation times) and geolocation accuracy for the targeted applications.

Moreover, by no longer needing to use a fixed collection of base stations defined beforehand in order to define the radio signature, and by adding the geographical positions of the base stations corresponding to the N selected values to the radio signature, the geolocation method is particularly able to withstand changes to the access network topology since the radio signatures remain relevant even if base stations are removed or added.

Furthermore, the setting up of such a geolocation method within a wireless communication system such as that described by way of example is particularly inexpensive. More specifically, thanks to the existence of terminals equipped with a positioning system in the communication system, it does not require the terminals or base stations to be equipped with additional specific hardware, it allows the calibration stage to be entirely automated, and updates to the access network (addition or removal of base stations) have almost no effect thereon.

Finally, it is important to note that, in the preferred embodiments described, the geolocation method has no effect on the power consumption of the terminals or base stations of the wireless communication system, since the steps carried out by the terminals or the base stations and used by the geolocation method are routine steps in the operation of the communication system which do not necessarily take place with the main purpose of contributing to the implementation of the geolocation method.

The aspects and methods of implementing the presently disclosed embodiment have been described by way of a non-limiting example, and alternative aspects are possible.

In particular, the disclosed embodiment has been described for an ultra-narrowband wireless radio communication system adapted to applications of the IoT type; however, this does not prevent the geolocation method according to the disclosed embodiment from being implemented for other types of communication systems, for example GSM, UMTS, LTE, or Wi-Fi cellular networks, etc.

The measurements representative of the radio link quality level used to form a radio signature can be carried out by the base stations over a radio uplink, but also by the terminals over a radio downlink. The measurements are, for example, transmitted to a server, which then carries out the steps of the geolocation method. According to other examples, the measurements representative of the radio link quality level could be carried out by the server itself, based on information received from the terminals or base stations.

As stated hereinabove, the value representative of the radio link quality can be different from the RSSI level. This can, for example, be a signal attenuation level, a signal-to-noise ratio, or another radio channel quality indicator. However, this value is deemed stable in time for the system considered in a given geographical position.

Different machine learning algorithms can be used to estimate the geographical position of a terminal based on the radio signature thereof and the reference data set. The use of one or another of these algorithms merely constitutes an alternative method of implementing the disclosed embodiment.

Finally, the selection method and the number N of measurements selected to determine a radio signature in an optimal manner can vary as a function of the communication system considered. The corresponding examples used in the description must therefore not be considered to be limiting.

What is claimed is:

1. A method for geolocating a terminal, referred to as a "terminal of interest", of a wireless communication system comprising the steps of:

determining radio signatures respectively associated with different known geographical positions, each radio signature corresponding to a set of N values representative of the quality of radio links that exist between a calibration device, located in one of said known geographical positions, and a plurality of base stations of said wireless communication system, the radio signatures and the associated respective known geographical positions thereof forming a reference data set;

determining a radio signature for said terminal of interest located in a geographical position that is to be estimated;

estimating the geographical position of said terminal of interest based on the radio signature of said terminal of interest and on the reference data set;

wherein each step of determining of a radio signature includes:

measuring, for each base station of the plurality of base stations, a value representative of the quality of the radio link that exists between the calibration device or the terminal of interest and the base station considered;

selecting N values from a set of Q measured values, wherein Q is a total of the measured values for the geographical position, and N is less than Q;

forming the radio signature, comprising therein the N selected values and the respective geographical positions of the N base stations used to measure said N selected values; and wherein the estimating of the geographical position of said terminal of interest is effected with a regression supervised learning algorithm based on the radio signature of said terminal of interest, the radio signatures in the reference data set, and the known geographical positions associated to the radio signatures in the reference data set.

2. The method for geolocating according to claim 1, wherein the N selected values correspond to the N values that represent the best radio link qualities measured for the base stations.

3. The method for geolocating according to claim 2, wherein the N selected values are ordered by descending order of radio link quality.

4. The method for geolocating according to claim 1, wherein the radio link is an uplink to the base stations of the wireless communication system.

5. The method for geolocating according to claim 4, wherein a calibration device is a terminal of the wireless communication system, referred to as a "calibration terminal", and the step of determining the radio signature of the calibration terminal located in a known geographical position includes the following steps of:
   transmitting, by the calibration terminal, a message to the plurality of base stations;
   measuring, for each base station of the plurality of base stations, a value representative of the quality of the radio link that exists between said calibration terminal and said base station based on the message received from said calibration terminal;
   selecting, by a server connected to the base stations, N values from the set of measured values;
   forming, by the server, the radio signature of the calibration terminal, including therein the N selected values and the geographical positions of the base stations used to measure the N selected values.

6. The method for geolocating according to claim 5, wherein, the calibration terminal being equipped with a positioning system, the step of determining the radio signature of the calibration terminal comprises the steps of:
   including, in the message transmitted by the calibration terminal to the plurality of base stations, the current geographical position of the calibration terminal measured by the positioning system;
   extracting, by the server, the geographical position contained in said message.

7. The method for geolocating according to claim 5, wherein a plurality of calibration terminals are put into effect for a predefined duration in order to form the reference data set.

8. The method for geolocating according to claim 5, wherein the reference data set is constantly enriched with new data originating from calibration terminals.

9. The method for geolocating according to claim 4, wherein the step of determining the radio signature of the terminal of interest located in a geographical position to be estimated comprises the following steps of:
   transmitting, by the terminal of interest, a message to the plurality of base stations;
   measuring, for each base station of the plurality of base stations, a value representative of the quality of the radio link that exists between said terminal of interest and said base station based on the message received from said terminal of interest;
   selecting, by a server connected to the base stations, N values from the set of measured values;
   forming, by the server, the radio signature of the terminal of interest, comprising therein the N selected values and the geographical positions of the base stations used to measure the N selected values.

10. The method for geolocating according to claim 1, wherein the value representative of the quality of the radio link that exists between a terminal or a calibration device and a base station is a received signal strength indicator for a radio signal exchanged between said base station and said terminal or said calibration device.

11. The method for geolocating according to claim 1, wherein the radio link is an ultra-narrowband communication channel.

12. The method for geolocating according to claim 1, wherein the estimated geographical position of the terminal of interest and the associated radio signature are added to the reference data set.

13. The method for geolocating according to claim 1, wherein the number N of values selected when determining a radio signature is a positive integer that lies in the range 5 to 20.

14. A wireless communication system comprising terminals and an access network comprising a plurality of base stations connected to a server, said system comprising a database storing a reference data set, each reference datum corresponding to a radio signature associated with a known geographical position, each radio signature comprising N values representative of the quality of radio links that exist between a calibration device located in one of said known geographical positions and N base stations and the geographical positions of said N base stations, wherein the access network is configured for:
   measuring a value representative of the quality of the radio link that exists between each base station and a terminal, the geographical position whereof must be estimated, referred to as the "terminal of interest";
   selecting N values from a set of Q measured values for said terminal of interest, wherein N is less than Q;
   forming a radio signature corresponding to the set of N selected values and geographical positions of the base stations used to measure the N selected values;
   estimating the geographical position of said terminal of interest with a regression supervised learning algorithm based on the radio signature of said terminal of interest, the radio signatures in the reference data set, and the known geographical positions associated to the radio signatures in the reference data set.

* * * * *